United States Patent Office 3,153,612
Patented Oct. 20, 1964

3,153,612
INDANE-1,3-DIONE RODENTICIDE
Darius Molho, Boulogne, Eugène Boschetti, Venissieux, and Louis Fontaine, Lyon, France, assignors to Lipha, Lyonnaise Industrielle Pharmaceutique, Lyon, France
No Drawing. Filed May 19, 1961, Ser. No. 111,150
Claims priority, application France, May 24, 1960, 828,060, Patent 1,269,638
8 Claims. (Cl. 167—46)

It is known that certain derivatives of indane-1,3-dione have the property of lowering the amount of prothrombin in the blood and as such can be used as rodenticides, because they cause a high mortality by internal hemorrhage among the rats which have consumed food to which the products are added.

In particular, certain 2-aryl-indane-1,3-diones, such as the alpha-naphthyl-indane-1,3-dione, which have formed the subject of French Patent No. 1,085,097 of June 18, 1953, in the name of the first of the present inventors, have proved to be very interesting compounds because they are innocuous to man and domestic animals. Other derivatives, such as 1,1-diphenyl-2-acetyl-indane-1,3-dione, have also been proposed. However, none of the known compounds of this series has a toxicity and a sufficiently attractive power with respect to these animals for permitting the rapid mass destruction thereof, and only a relatively prolonged use can result in the disappearance of the rodents. In addition, certain compounds such as 1,1-diphenyl-2-acetyl-indane-1,3-dione show an inadequate specificity.

The present invention relates to compounds of the same series which are however free from the aforesaid disadvantages and which permit of quickly obtaining an almost complete mortality of the rodents to be destroyed, while having a good attractive power for such rodents and only showing a low degree of toxicity for domestic animals and human beings. These compounds are formed by the (bis-phenyl)-2-acetyl-indane-1,3-diones of the general formula

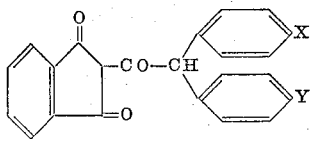

in which: X represents a substituent of the group formed by the halogens and the aryl radicals, Y represents a member of the group formed by hydrogen, the halogens and the aryl radicals.

It is surprising to find that the presence of the X substituent and possibly of the Y substituent, in the p-position on the phenyl nuclei of the 1',1'-diphenyl-2-acetyl-indane-1,3-dione, a compound which is already known, strengthens the rodenticidal properties of this compound in a very important manner. In actual fact, comparison tests carried out on three of the compounds according to the invention, namely (1'-p-chlorophenyl-1'-phenyl)-2-acetyl-indane-1,3-dione, which will hereinafter be referred to for the sake of simplicity as (compound A), the (1' - p - bromophenyl-1'-phenyl)-2-acetyl-indane-1,3-dione) (compound B) and the [1'-(4'-diphenyl)-1'-phenyl]-2-acetyl-indane-1,3-dione (compound C), on the one hand, and on the (1-phenyl-2-acetyl)-3-ethyl-4-hydroxy-coumarine, a known compound considered as being very active, and on diphenyl-2-acetyl-indane-1,3-dione, on the other hand, have shown the superior rodenticidal efficiency of the compounds according to the invention.

In the first place, the rodenticidal activity proper (mortality for a predetermined consumption) has been determined according to the test protocol established at the London conference in October 1958 concerning the combating of harmful rodents. The results obtained in connection with batches of adult white rats are set out in the following table:

| Compound | Concentration | Mortality |
|---|---|---|
| (1-phenyl-2-acetyl)-3-ethyl-4-hydroxy coumarine | 0.025°/₀₀ | 2/20 |
| Diphenyl-2-acetyl-indane-1,3-dione | 0.05°/₀₀ | 6/10 |
| A | 0.025°/₀₀ | 15/20 |
| B | 0.025°/₀₀ | 7/10 |
| C | 0.025°/₀₀ | 9/10 |

The power of attraction of the poisoned food is of the same order of magnitude with the compounds according to the invention as with the known compounds, and it is sometimes superior thereto. Thus, batches of 10 rats given simultaneous access to poisoned grain and ordinary grain have consumed 98 g. of grain with 0.05%₀ of compound A against 154 g. of non-toxic grain, 45 g. of grain with 0.025%₀ of (1-phenyl-2-acetyl)-3-ethyl-4-hydroxy coumarine against 171 g. of non-toxic grain, and 56 g. of grain with 0.05% of diphenyl-2-acetyl-indane-1,3-dione against 216 g. of non-toxic grain.

The toxicity of the compounds according to the invention with respect to domestic animals has been determined by comparison with that of (1-phenyl-2-acetyl)-3-ethyl-4-hydroxy coumarine on batches of young pigs weighing 30 kg. After these pigs had for 15 days eaten exclusively a ration containing 1% of toxic feeding stuff with 0.25%₀ of (1-phenyl-2-acetyl)-3-ethyl-4-hydroxy coumarine, these pigs suffered from external hemorrages, a loss of appetite and emaciation. On the other hand, pigs which had during the same period eaten a ration containing 1% of toxic feeding stuff with 0.05% of the compounds A, B and C according to the invention still had a normal appearance and behaved normally.

The rodenticidal activity of the compounds according to the invention is, as has been seen, due to their property of producing internal hemorrhages by lowering the amount of prothrombin in the blood. Although this lowering of the amount of prothrombin is appreciably lower with the higher mammals such as man than that observed with the rodents, which explains its innocuousness in that respect, it could possibly be used for therapeutic purposes.

The compounds of the invention can be prepared by condensation of 1,1-diphenyl-2-propanones of the general formula

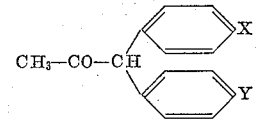

in which X and Y have the same meaning as before, with a compound having a phthalyl radical. The compound used is preferably a phthalic ester, such as methyl phthalate, and the condensation is then carried out in the presence of an alkali alcoholate, for example sodium methylate.

The 1,1-diphenyl-2-propanones substituted in the p-position on at least one of the phenyl nuclei mentioned above are themselves novel compounds and in this respect form part of the invention. They can themselves be prepared by bromination of a phenyl acetone, possibly substituted in the p-position by a halogen or an aryl radical, then condensation of the bromophenyl acetone obtained with the compound $C_6H_5X$, in which X has the same meaning as above, in the presence of a Friedel-Crafts catalyst, such as aluminum chloride.

The preparation and the physical constants of four compounds according to the invention will hereinafter be described as non-limitative examples:

EXAMPLE 1

(1'-p-Chlorophenyl-1'-Phenyl)-2-Acetyl-Indane-1,3-Dione

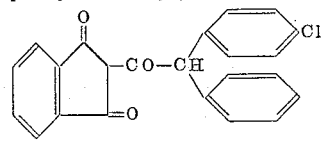

(a) PREPARATION OF THE 1-BROMOPHENYL-ACETONE 67 g. (0.5 mol) of phenyl acetone dissolved in 300 cc. of carbon disulphide, are introduced into a 1-liter flask equipped with a stirrer device, a condenser and a dropping funnel, and 80 g. (0.5 mol) of bromine are added dropwise while stirring. After completing the addition, stirring is continued in the cold for 2 hours; when the release of hydrobromic acid has ceased, the flask is heated on a water bath with a slight reflux until the release has terminated and then a strong current of carbon dioxide is introduced into the flask. The solution which is obtained is deep green in colour.

(b) PREPARATION OF THE 1'-p-CHLOROPHENYL-1'-PHENYL-2'-PROPANONE

The same flask as before is used and there are successively introduced thereinto:

133.5 g. of aluminium chloride (1 mol)
250 cc. of carbon disulphide
67.5 g. of chlorobenzene (0.6 mol)

After having started the stirrer device, the solution of 1-bromophenyl acetone previously obtained is gradually introduced by way of the dropping funnel over a period of 1 hour. The flask is then heated with slight reflux, while continuing the stirring until the release of hydrobromic acid ceases, this taking 2 to 3 hours.

The carbon disulphide is distilled on the water bath, and then the blackish and oily liquid which remains is carefully poured on to 1000 g. of ice to which are added 200 cc. of concentrated hydrochloric acid. The oily layer which forms is taken up in ether and washed with water and then with a concentrated solution of sodium bicarbonate. The solution in the ether is then dried over calcium chloride. The ether is distilled and the product is rectified in a flask with a Vigreux column. The clear yellow liquid distils at 150° C./0.5 mm. Hg. The yield is 76% with respect to the initial phenyl acetone.

The semi-carbazone of the 1'-p-chlorophenyl-1'-phenyl-2-propanone obtained melts at 118° C.

(c) PREPARATION OF THE (1'-p-CHLOROPHENYL-1'-PHENYL)-2-ACETYL-INDANE-1,3-DIONE

A flask similar to the foregoing is used, the flask comprising a reflux condenser above which is an ordinary condenser. Sodium methylate is prepared by the action of 3.45 g. of sodium (0.15 mol) on 30 cc. of dry methanol. When the solution has completely reacted, 100 cc. of benzene are added while stirring and the solution is slowly distilled to dryness.

150 cc. of benzene and 24.25 g. (0.125 mol) of methyl phthalate are then introduced and the substance is boiled under reflux while stirring. A solution of 12.2 g. of 1'-p-chlorophenyl-1'-phenyl-2-propanone (0.05 mol) in 50 cc. of benzene is poured in dropwise over 1 hour, while distilling 50 cc. of a mixture of methanol and benzene. A fresh solution of 12.2 g. (0.05 mol) of this same ketone in 50 cc. of benzene, to which has been added 9.7 g. (0.05 mol) of methyl phthalate, is poured in dropwise over a period of 1 hour, while again distilling 50 cc. of a mixture of methanol and benzene.

The benzene is then distilled and the temperature is brought to 130–140° C. for 1¼ hours while stirring. The mass of the product becomes thick and deep red in colour. 100 cc. of ethanol (96° GL) are then added and the mass is stirred under reflux until the product dissolves. The ethyl solution is concentrated to about 50 cc., then acidified in an ice bath with concentrated hydrochloric acid. The product solidifies immediately or after adding a small quantity of acetone while stirring.

The crude product is centrifuged, washed with water, and recrystallized from ethanol or acetone, as light yellow silky needles with a melting point of 138° C. The yield is 58%.

Quantitative analysis gives:

| | C, Percent | H, Percent |
|---|---|---|
| Percentages: | | |
| Calculated | 73.5 | 4.26 |
| Found | 73.4 | 4.09 |

EXAMPLE 2

(1'-p-Bromophenyl-1'-Phenyl)-2-Acetyl-Indane-1,3-Dione (a) PREPARATION OF THE 1'-p-BROMOPHENYL-1'-PHENYL-2-PROPANONE This compound is prepared in analogous manner to the 1'-p-chlorophenyl-1'-phenyl-2-propanone, starting from 1-bromophenyl acetone and bromobenzene, in the presence of aluminium chloride. It is a yellow liquid distilling at 175° C./1 mm. Hg. The corresponding semi-carbazone melts at 138° C.

(b) PREPARATION OF THE (1'-p-BROMOPHENYL)-2-ACETYL-INDANE-1,3-DIONE

This is obtained in a manner analogous to that of the chlorine derivative, starting from 1'-p-bromophenyl-1'-phenyl-2'-propanone as above and methyl phthalate. The product crystallised in acetone is light yellow and melts at 154° C. The yield is slightly less than that obtained in Example 1.

EXAMPLE 3

[1'-(4'-Diphenyl)-1'-Phenyl]-2-Acetyl-Indane-1,3-Dione (a) PREPARATION OF THE 1-(4'-DIPHENYL)-1-PHENYL-2-PROPANONE This compound is prepared in a manner analogous to the previous ketones by condensation of the 1-bromophenyl-acetone and diphenyl in the presence of aluminium chloride. It distils at 195° C./0.5 mm. Hg while solidifying. Recrystallised from ethanol it assumes the form of white crystals melting at 120–121° C. The corresponding semi-carbazone melts at 122° C.

(b) PREPARATION OF THE [1'(4'-DIPHENYL)-1'-PHENYL]-2-ACETYL-INDANE-1,3-DIONE

The preparation was carried out in a manner analogous to that described in Example 1, starting from the 1-(4'-diphenyl)-1-phenyl-2-propanone and methyl phthalate in the presence of sodium methylate. The product crystallises as fine yellow silky needles with a melting point of 177–178° C. Yield: 52%.

EXAMPLE 4

(1',1'-Bis-p-Chlorophenyl)-2-Acetyl-Indane-1,3-Dione (a) PREPARATION OF THE 1-BROMO-1-p-CHLOROPHENYL-ACETONE The p-chlorophenyl-acetone is prepared from the p-chlorobenzaldehyde according to the working method similar to that described in connection with the preparation of the o-methoxyphenyl-acetone in Organic Syntheses, volume 35, page 74. The p-chlorophenyl acetone is then brominated in the manner indicated in the previous examples in respect of the phenyl acetone.

(b) PREPARATION OF THE (1,1-BIS-p-CHLOROPHENYL)-2-PROPANONE

The 1-bromo-1-p-chlorophenyl-acetone is condensed with chlorobenzene in the presence of aluminium chloride, in a manner analogous to that which has been described in Example 1 for the condensation of the 1-bromophenyl-acetone with chlorobenzene. A light yellow oil is obtained, which distils between 190 and 200° C./2 mm. The semi-carbazone melts at 169–170° C. The yield is in the region of those obtained in the preceding examples.

(c) PREPARATION OF THE (1',1'-BIS-p-CHLORO-PHENYL)-2-ACETYL-INDANE-1,3-DIONE

The (1,1-bis-p-chlorophenyl)-2-propanone is treated with methyl phthalate in the presence of sodium methylate in accordance with a working method similar to that of the preceding examples. After crystallisation in alcohol, the final product is obtained in the form of yellow needles with a melting point of 115–117° C.; the yield is in the region of those of the preceding examples.

The invention quite obviously covers the compounds in which the substituents in the p-position of the phenyl nuceli are different. The preparation is then carried out with a phenyl acetone comprising in the p-position a substituent different from that of the compound $C_6H_5X$ with which it is condensed in order to obtain a (1,1-bis-phenyl)-2-propanone.

What we claim is:

1. A method which comprises feeding to a rodent a composition containing a compound of the formula

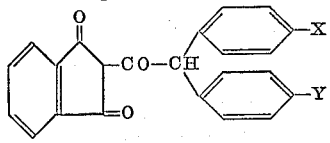

wherein X is a member of the group consisting of chlorine, bromine and phenyl, and Y is a member of the group consisting of hydrogen, chlorine, bromine and phenyl, said composition having rodenticidal properties.

2. A method in accordance with claim 1, wherein the compound is (1'-para-chloro-phenyl-1'-phenyl)-2-acetyl-indane-1,3-dione.

3. A method in accordance with claim 1, wherein the compound is (1'-para-bromo-phenyl-1'-phenyl)-2-acetyl-indane-1,3-dione.

4. A method in accordance with claim 1, wherein the compound is [(1'-(4'-diphenyl)-1'-phenyl)]-2-acetyl-indane-1,3-dione.

5. A rodenticidal composition comprising a food stuff palatable to rodents and a compound of the formula:

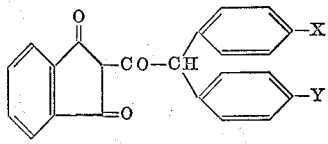

wherein X is a member of the group consisting of chlorine, bromine and phenyl, and Y is a member of the group consisting of hydrogen, chlorine, bromine and phenyl.

6. A rodenticidal composition in accordance with claim 5, wherein the compound is (1'-para-chloro-phenyl-1'-phenyl)-2-acetyl-indane-1,3-dione.

7. A rodenticidal composition in accordance with claim 5, wherein the compound is (1'-para-bromo-phenyl-1'-phenyl)-2-acetyl-indane-1,3-dione.

8. A rodenticidal composition in accordance with claim 5, wherein the indane-dione is [(1'-(4-diphenyl)-1'-phenyl)]-2-acetyl-indane-1,3-dione.

References Cited in the file of this patent

UNITED STATES PATENTS

| | | |
|---|---|---|
| 2,703,329 | Schultz | Mar. 1, 1955 |
| 2,820,738 | Litvan et al. | Jan. 21, 1958 |
| 2,827,489 | Birkenmeyer et al. | Mar. 18, 1958 |
| 2,880,132 | Schwarcz | Mar. 31, 1959 |
| 2,883,423 | Mosher et al. | Apr. 21, 1959 |
| 2,900,302 | Correll | Aug. 18, 1959 |

OTHER REFERENCES

Giampero Pasero, 19 Dtsch. Med. Wschr. 855 (May 6, 1960).